Figure 1:
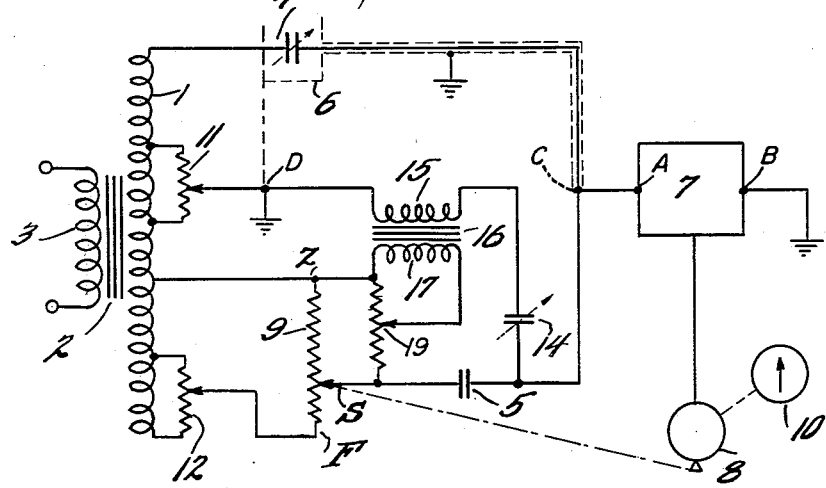

Feb. 27, 1962    S. J. SMITH    3,022,665
LIQUID CONTENTS GAUGES
Filed Oct. 2, 1950

INVENTOR.

BY Stanley J. Smith
Watson, Cole, Grindle & Watson
Attorneys

United States Patent Office 3,022,665
Patented Feb. 27, 1962

3,022,665
LIQUID CONTENTS GAUGES
Stanley J. Smith, New York, N.Y., assignor to Simmonds Precision Products, Inc., a corporation of New York
Filed Oct. 2, 1950, Ser. No. 187,948
14 Claims. (Cl. 73—304)

This invention relates to liquid contents gauges of the kind in which measurement of the mass of liquid is effected in terms of the capacity of a condenser, which is arranged in the container for the liquid in such manner as to be immersed in the liquid to an extent dependent on the volume present.

Gauges of this kind, which are increasingly being used as fuel gauges on aircraft, consist essentially, in addition to the condenser arranged in the liquid container and termed herein the measuring condenser, of electrical equipment for measuring the capacity of the measuring condenser and producing a deflection of indicating means which is proportional to the change in capacity.

Such indicating means is, however, calibrated in terms of mass of the liquid in the container and since the capacity of the measuring condenser will be dependent only on the extent to which it is immersed in the liquid and on the dielectric constant of the liquid, errors in the indicated mass will occur if the gauge is used with a liquid having a density appreciably different from that of the liquid for which the gauge has been calibrated.

Accordingly, if a high accuracy in reading is to be obtained, it is necessary to provide compensation for changes in dielectric constant which takes into account changes in density, if these factors are liable to vary as in the case, for example, where such a gauge is used to measure fuel in aircraft.

However, as has been shown in my prior United States application, Serial No. 152,336, now abandoned, analysis of a large range of aircraft fuels commonly in use reveals that, provided proper compensation for changes in dielectric constant is effected, acceptable reading accuracy may be obtained, although no specific correction is provided for changes in density.

In practice, if the indicated range of the gauge system is varied by a factor dependent on the dielectric constant of the fuel, satisfactory accuracy may be obtained for different fuels varying widely in both density and dielectric constant.

The present invention accordingly has for an object the provision, in a liquid contents gauge of the kind described, of means which is responsive to the dielectric constant of the liquid being gauged and operates to correct the indicated reading of such gauge, if the dielectric constant changes such as to introduce an error in gauge reading.

A further object of this invention is to provide in a capacitance-type liquid quantity gauge means for varying the indicated range of the gauge in proportion to the dielectric constant of the liquid. The means provided is an improvement over the means provided in my copending applications, Serial Nos. 162,691 and 162,692, filed May 18, 1950, and now abandoned in favor of the present application.

Figure 2:
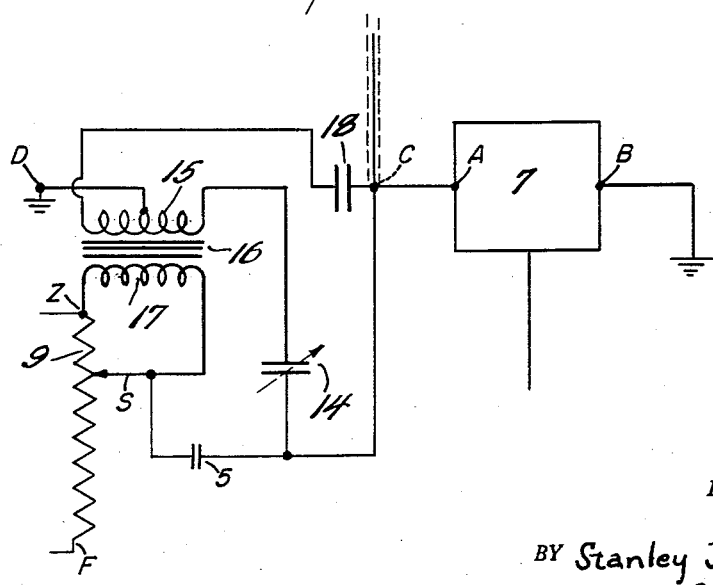

Other objects and advantages of the invention will become apparent during the course of the following description of one form of the invention, as illustrated in the accompanying drawing, in which:

FIGURE 1 shows a simplified wiring diagram of a known form of liquid gauge, modified in accordance with this invention; and FIGURE 2 shows a portion of the circuit of FIGURE 1, illustrating a further modification.

Referring to the drawing, the gauge system there illustrated is of the kind comprising a self-balancing bridge arrangement in which movement of the balancing means is used to indicate liquid mass. The bridge comprises the two halves of the secondary winding 1 of transformer 2, the primary winding 3 of which is conveniently connected with a source of alternating current, and the condensers 4 and 5. The condenser 4 is the measuring condenser which is arranged in the liquid container and surrounded by a grounded shield indicated at 6, while the condenser 5 is a reference condenser. An electronic amplifier 7 has one input terminal B connected via ground and the lower portion of potentiometer 11 to the center of the secondary winding 1 of transformer 2 and has its other input terminal A connected to the junction C of condensers 4 and 5, so that any unbalance in the bridge causes a voltage of respective polarity to be applied to the input of the amplifier 7. A motor 8, connected with the output of the amplifier 7 and arranged for rotation in either direction according to the sense of unbalance of the bridge, is arranged to adjust the setting of a potentiometer 9, which is connected across the lower part of the secondary winding 1 so as to apply to the input of the amplifier 7 through the condenser 5, a potential which in a gauge system of the known kind balances the potential applied to the amplifier 7 through the measuring condenser 4 from the upper part of the secondary winding 1. Accordingly, if the capacity of the measuring condenser 4 changes, owing to a change in mass of liquid in the container in which the condenser 4 is positioned, the resulting unbalance in the bridge will cause the motor 8 to rotate to adjust the rebalancing potentiometer 9 to rebalance the bridge. The degree of movement of this motor will thus represent the change in capacity of the measuring condenser 4 and accordingly an indicating dial 10 driven from the motor may be calibrated in terms of liquid mass as represented by the capacity of the condenser 4. The potentiometer 11 is provided to enable the zero setting of the arrangement to be adjusted while the potentiometer 12 controls the voltage set up across the rebalancing potentiometer 9 and hence the extent to which this potentiometer has to be moved to rebalance the bridge; accordingly, the potentiometer 12 adjusts the range of the system.

As so far described, the gauge system is of the known kind.

In order to provide compensation for errors in mass measurement inherent in changes in dielectric constant of the liquid, there is provided in accordance with the present invention a further condenser 14, which is constructed with a minimum of solid dielectric material separating its electrodes and positioned in the liquid being gauged so that at all times it is completely immersed therein. The compensation condenser 14 is connected in series with the secondary winding 15 of transformer 16 between ground and the input terminal A of the amplifier 7, while the primary winding 17 of the transformer is connected between the zero end Z of the potentiometer 9 and the slide S thereon.

When the slide S is at the zero end Z of the potentiometer 9 there will be no voltage impressed on the transformer 16 and consequently the capacitance of the compensation condenser 14 is in effect electrically across the amplifier input to ground and will have no effect other than to lower the potential impressed on the amplifier input. In any other position of the slide S, however, a potential will be applied to the winding 17 which is in phase with that applied to the condenser 5 and the induced voltage in the secondary winding will cause an auxiliary or monitoring potential to be applied to the amplifier input terminal A which is proportional to the capacity of the compensation condenser 14 which in turn depends upon the dielectric constant of the liquid being measured and to the setting of the slide of the potentiometer 9. The polarity of this auxiliary or monitoring potential will be such as to supplement or in effect to increase the potential applied to the amplifier input through the condenser 5 so that the effect will be to reduce the otherwise falsely high scale reading which would occur if condenser 14 was omitted. Accordingly a change in the dielectric constant of the liquid being gauged will vary the potential applied through the compensation condenser 14 and the resulting prevention of a false change in reading will be an effect which is directly proportional to the scale reading, being zero at zero reading and a maximum at the maximum scale reading.

Considered from the standpoint of current flow, the inherent operation of the gauge of FIGURE 1 may be described as follows.

It will be apparent that from the grounded terminal D up through the upper portion of potentiometer 11 and the uppermost portion of secondary winding 1 to the top of winding 1 constitutes, in effect, a first source of alternating voltage which is initially adjustable by the slider of potentiometer 11. Similarly, from the grounded terminal D down through the lower portion of potentiometer 11, through the intermediate portion of secondary winding 1 and through the upper portion of potentiometer 9 to the slider S constitutes, in effect, a second source of alternating voltage which is adjustable by means of slider S without appreciably affecting the voltage of the first such source. Similarly, the secondary winding 15 of transformer 16 constitutes, in effect, a third source of alternating voltage having a magnitude which is substantially proportional to the magnitude of the adjustable second source. It will be apparent that the second and third sources are in opposition to the first source with respect to the amplifier input.

When the bridge is balanced a first A.C. current of source frequency flows in a first circuit which may be traced from ground up through the upper portion of potentiometer 11 and the upper portion of secondary winding 1, through measuring condenser 4 to the bridge output terminal C and the amplifier input terminal A and through the amplifier input via terminal B back to ground.

At the same time a second A.C. current of source frequency which is substantially 180° out of phase with the first current flows in a second circuit which may be traced from ground down through the lower portion of potentiometer 11 and an intermediate portion of secondary winding 1, through rebalancing potentiometer 9, through reference condenser 5 to the bridge output terminal C and the amplifier input terminal A and through the amplifier input via terminal B back to ground.

At the same time a third A.C. current of source frequency, which is substantially 180° out of phase with the first current and substantially in phase with the second current, flows through a third circuit which, in the embodiment illustrated, may be traced from ground through the secondary winding 15 of transformer 16, through the monitoring condenser 14 to bridge output terminal C and amplifier input terminal A and through the amplifier input via terminal B back to ground.

When the bridge is balanced the magnitude or amplitude of the first current is equal to the sum of the magnitudes of the second and third currents so that the A.C. voltage of source frequency appearing across terminals A and B and across terminals C and D due to the measuring condenser 4 is balanced out by the resultant A.C. voltage of source frequency appearing across terminals A and B and across terminals C and D due to the added currents from the reference condenser 5 and the monitoring condenser 14 so that there results an effective A.C. voltage of zero magnitude across the input to the amplifier.

When the bridge becomes unbalanced due to an increase or decrease in the capacitance of measuring condenser 4 caused by a respective increase or decrease in the mass of liquid present in the container, the magnitude of the first current increases or decreases respectively to a new value so that there is developed across terminals A and B and across terminals C and D a resultant A.C. unbalance voltage of a magnitude substantially proportional to the extent of the change in liquid mass and either substantially in phase or substantially 180° out of phase with the source voltage depending upon whether the change in liquid mass is an increase or decrease. In order to rebalance the bridge motor 8 must adjust slider S until the sum of the magnitudes of the second and third currents equals the new magnitude of the first current so that the magnitude of the resultant unbalance voltage across the pairs of terminals A, B and C, D is decreased to zero again. Thus, if the bridge unbalance has been produced by an increase in liquid mass in the container, then slider S must be moved farther away from the zero end Z for rebalance; similarly, if bridge unbalance has been produced by a decrease in liquid mass, then slider S must be moved towards zero end Z for rebalance.

When the dielectric constant of the liquid increases or decreases unaccompanied by a change in mass the first current will correspondingly increase or decrease respectively. However, bridge balance will be preserved since the immersed monitoring condenser 14 will be subjected to the identical increase or decrease in dielectric constant and will accordingly increase or decrease respectively the magnitude of the third current so that the sum of the second and third currents will equal the new magnitude of the first currents to preserve balance.

The arrangement of this invention offers the advantage that the compensation condenser 14 may be of a reasonable size since it operates with a high impedance load and also because the transformer 16 may provide a considerable voltage step up. Accordingly the physical size of the compensation condenser 14 may be such as will permit it to be located in the bottom of the liquid container where it will always be immersed in the liquid or it may be disposed conveniently in a liquid outlet pipe from the container.

The effect of the compensation condenser 14 on the rebalancing voltage in the bridge may be adjusted by means of a potentiometer connected across either winding of the transformer 16. As shown, the potentiometer 19 connected across the primary winding 17 is provided for this purpose.

The impedance of the windings of the transformer 16 may be quite low since it is fed from a source, the potentiometer 9, which is of low impedance and consequently the effects of stray capacity in the wiring from the transformer to the remotely located condenser 14 will be unimportant.

The present invention thus provides an arrangement in which the scale readings of the gauge are compensated in a very simple manner for errors reflected in changes in dielectric constant of the liquid being gauged, and accordingly a high degree of accuracy may be achieved in the measurement of a liquid such as an aircraft fuel which is liable to change both as regards density and as regards dielectric constant.

Under certain conditions where it is desirable for mechanical reasons to make the condenser 14 of extremely low capacitance, the secondary winding 15 of transformer 16 may be provided with a grounded center tap and an additional fixed condenser 18, as shown in FIGURE 2. The condensers 18 and 14 are then connected in series across the secondary winding and the junction point of them connected to the amplifier input. This arrangement permits the initial effect of condenser 14 to be cancelled out so that the circuit will be affected only by change in the value of this condenser. The improved ratio so obtained permits a substantial reduction in the initial value of condenser 14. In FIGURE 2 potentiometer 19 has been omitted and the primary winding 17 of transformer 16 is connected directly across the output of potentiometer 9.

I claim:
1. A capacitance-type dielectric liquid contents gauge, comprising an amplifier, a bridge having its input adapted to be electrically coupled to a source of periodically fluctuating voltage and having its output electrically coupled to the input to said amplifier, said bridge having permanently in its measuring and reference arms respectively a liquid contents measuring condenser and a reference condenser for respectively establishing at the input to said amplifier a voltage substantially proportional to the capacitance of said measuring condenser and an opposing voltage substantially proportional to the capacitance of said reference condenser, a bridge-rebalancing potentiometer having its output electrically coupled in series with said reference condenser to control the magnitude of said opposing voltage, means for modifying said opposing voltage, said last-mentioned means comprising a transformer having primary winding means electrically coupled across the output of said potentiometer to receive a voltage corresponding to the setting thereof, and a third condenser having electrode surfaces adapted for approximately complete immersion in the liquid being measured and electrically connected in series with a secondary winding means of said transformer across the input to said amplifier, a motor operable in response to amplified bridge unbalance voltages appearing at the output of said amplifier to adjust the setting of said rebalancing potentiometer in a direction tending to restore bridge balance, and liquid contents indicating means controlled by said motor.

2. A capacitance-type dielectric liquid contents gauge, comprising a supply transformer having primary winding means and secondary winding means, a balanceable network comprising a liquid contents measuring condenser and a reference condenser connected in series, an amplifier having its input electrically coupled between the junction of said condensers and an intermediate point on said secondary winding means, a network-rebalancing potentiometer having its input electrically coupled across a portion of said secondary winding means on one side of said intermediate point and having its adjustable output electrically coupled in series with said reference condenser to control the magnitude of the voltage applied to said reference condenser, said measuring condenser being connected to said secondary winding means on the other side of said intermediate point a second transformer having primary winding means electrically coupled across the adjustable output of said potentiometer to receive a voltage proportional to the setting thereof and having secondary winding means, a third condenser for substantially total immersion in the liquid being measured and electrically coupled in series with said secondary winding means of said second transformer across the input to said amplifier, a reversible motor electrically coupled to the output of said amplifier and having its rotor mechanically coupled to the slider of said potentiometer to adjust said slider in a direction tending to rebalance said network, and liquid contents indicating means driven by said motor.

3. A capacitance-type dielectric liquid contents gauge, comprising a supply transformer having primary winding means and secondary winding means, a balanceable network comprising a liquid contents measuring condenser and a reference condenser connected in series, an amplifier having its two input terminals electrically coupled to the junction of said condensers and an intermediate point on said secondary winding means respectively, a network-rebalancing potentiometer having its input electrically coupled across a portion of said secondary winding means on one side of said intermediate point and having its adjustable output electrically coupled in series with said reference condenser to control the magnitude of the voltage applied to said reference condenser, said measuring condenser being connected to said secondary winding on the other side of said intermediate point, a second transformer having primary winding means electrically coupled across the adjustable output of said potentiometer to receive a voltage proportional to the setting thereof and a center-tapped secondary winding having its center tap electrically coupled to one of the input terminals of said amplifier, a third condenser for substantially total immersion in the liquid being measured, a non-immersed fourth condenser, said third and fourth condensers being electrically coupled respectively between opposite ends of said center-tapped secondary winding and the other input terminal of said amplifier, said fourth condenser being arranged to cancel out the initial effect of said third condenser, a reversible motor electrically coupled to the output of said amplifier and having its rotor mechanically coupled to the slider of said potentiometer to adjust said slider in a direction tending to rebalance said network, and liquid contents indicating means driven by said motor.

4. A capacitance-type dielectric liquid contents gauge, comprising a supply transformer having primary winding means and secondary winding means having an intermediate tap, a balanceable network comprising a liquid contents measuring condenser and a reference condenser connected in series, a network-rebalancing potentiometer having its input electrically coupled across a portion of said secondary winding means on one side of said intermediate tap and having its adjustable output electrically coupled in series with said reference condenser to control the magnitude of the voltage applied to said reference condenser, said measuring condenser being connected to said secondary winding means on the other side of said intermediate tap, a second transformer having primary winding means electrically coupled across the adjustable output of said potentiometer to receive a voltage proportional to the setting thereof and having secondary winding means, a third condenser for substantially total immersion in the liquid being measured and electrically coupled in series with said secondary winding means of said second transformer between said tap and the junction of said measuring and reference condensers, unbalance detecting and rebalancing means electrically coupled between said tap and said junction and mechanically coupled to the slider of said potentiometer for adjusting said slider in a direction tending to rebalance said network in response to network unbalance, and liquid contents indicating means controlled by said last mentioned means.

5. A capacitance-type dielectric liquid contents gauge, comprising a supply transformer having primary winding means and secondary winding means having an intermediate tap, a balanceable network comprising a liquid contents measuring condenser and a reference condenser connected in series, a network-rebalancing potentiometer having its input electrically coupled across a portion of said secondary winding means on one side of said intermediate tap and having its adjustable output electrically coupled in series with said reference condenser to control the magnitude of the voltage applied to said reference condenser, said measuring condenser being connected to said secondary winding on the other side of said intermediate tap, a second transformer having primary winding means electrically coupled across the adjustable output of said potentiometer to receive a voltage proportional to the setting thereof and having a center-tapped secondary winding having its center tap electrically coupled to said intermediate tap, a third condenser for substantially total immersion in the liquid being measured, a non-immersed fourth condenser, said third and fourth condensers being electrically coupled respectively between opposite ends of said center-tapped secondary winding and the junction of said measuring and reference condensers, said fourth condenser being arranged to cancel out the initial effect of said third condenser, unbalance detecting and rebalancing means electrically coupled between said intermediate tap and said junction and mechanically coupled to the slider of said potentiometer for adjusting said slider in a direction tending to rebalance said network in response to network unbalance, and liquid contents indicating means controlled by said last mentioned means.

6. Gravimetric measuring apparatus comprising a first circuit including a first A.C. voltage source and a variable capacitor unit adapted to be inserted into a liquid being measured so that the capacity of the unit varies with the level of said liquid; a second circuit including a second A.C. voltage source out of phase with said first voltage source, and a compensating capacitor having a dielectric constant substantially the same as the dielectric constant of the liquid under measurement; a third circuit including a fixed source of A.C. voltage and a variable source of A.C. voltage out of phase with said first voltage source, and a reference capacitor; an amplifier common to said three circuits and connected to receive the outputs, respectively, thereof, and means operable under the control of said amplifier for varying said second voltage source and the variable voltage source of said third circuit in response to differential current output of said circuits in a direction tending to reduce said differential output current substantially to zero and indicating means under control of said last-named means.

7. Gravimetric measuring apparatus comprising a first circuit including a first A.C. voltage source and a variable capacitor unit adapted to be inserted into a liquid being measured so that the capacity of the unit varies with the level of said liquid; a second circuit including a second A.C. voltage source out of phase with said first voltage source, and a compensating capacitor having a dielectric constant substantially the same as the dielectric constant of the liquid under measurement; a third circuit including a fixed source of A.C. voltage and a variable source of A.C. voltage out of phase with said first voltage source; and a reference capacitor; an amplifier common to said three circuits and connected to receive the outputs, respectively, thereof, means operable under the control of said amplifier for varying said second voltage source and the variable voltage source of said third circuit in response to output current differential of said circuits so as to reduce said output current differential substantially to zero, the output of said first circuit being substantially 180° out of phase with the outputs of said second and third circuits; and indicating means under control of said last named means.

8. An apparatus for measuring the quantity of a liquid in a container comprising an elongated capacitive probe for insertion in said container so as to be immersed in said liquid in relation to the quantity of liquid present, a voltage responsive means, a first A.C. voltage source, a circuit including said probe, said voltage responsive means and said first voltage source; a compensating capacitor for complete immersion in said liquid; a variable second A.C. voltage source, a second circuit including said compensating capacitor and said second voltage source being connected in series with said voltage responsive means; a reference capacitor and a third source of voltage comprising said second voltage source and a fixed A.C. voltage source connected in series with said voltage responsive means, the currents in said circuits having a predetermined phase relation, whereby a resulting current flowing through said voltage responsive means is in phase opposition to the current of said first circuit and in phase with the current of said second circuit; and means operable under the control of said voltage responsive means for varying said second voltage source so as to reduce the total current input to said voltage responsive means substantially to zero.

9. A capacitive type liquid quantity measuring apparatus comprising in combination: a variable capacitor unit comprising a pair of electrodes adapted to be inserted into a container of liquid so that the capacity of the unit varies with the level of said liquid; a fixed comparison capacitor; a compensating capacitor utilizing said liquid as a dielectric; an A.C. voltage source for energizing said variable capacitor; an amplifier having an input circuit; a first circuit including said source of voltage, said variable capacitor and said amplifier input circuit; a second circuit including a source of A.C. voltage proportional to the level of the liquid being measured, said compensating capacitor, and said amplifier input circuit; a third circuit including a fixed source of A.C. voltage and a variable source of A.C. voltage, said fixed comparison capacitor, and said amplifier input circuit; varying means controlled by said amplifier for varying said second and third circuit voltages so as to reduce the current output of said amplifier to substantially zero; indicating means under control of said varying means, said means being controlled by said amplifier; and alternating current power supply means for energizing said varying means; said first, second and third circuit voltage sources having a predetermined phase relation, whereby the current from said first circuit is essentially opposite in phase to the current from said second and third circuits.

10. A capacitive type liquid quantity measuring apparatus comprising in combination: a first source of A.C. electrical energy; a voltage divider network connected to said first source of energy; an amplifier having an input circuit; a pair of electrodes adapted to be inserted into a container of liquid so that the interelectrode capacitance of the electrodes is a function of the level of the liquid; a first circuit comprising a portion of said voltage divider, said pair of electrodes and said input circuit; a second A.C. energy source; a potentiometer connected to said second energy source and provided with a movable tap means; a capacitor adapted to be immersed in said liquid so that liquid serves as a dielectric for said capacitor; means connecting said capacitor, said input circuit, said variable tap means and a portion of said potentiometer so as to form a second circuit; a third A.C. energy source; a fixed capacitor; a third circuit comprising means connecting said variable tap, said third energy source, said fixed capacitor and said input circuit, the current of the said third circuit being substantially in phase with the current of said second circuit and substantially 180° out of phase with the said first circuit current present in said input circuit; means controlled by said amplifier to vary the said movable tap, whereby to cancel out said out of phase currents in said input circuit and indicating means controlled by said last named means for indicating the quantity of liquid measured by said apparatus.

11. The apparatus of claim 10 having means to vary the portion of the voltage of the said second source of energy applied to said potentiometer, whereby to adjust said apparatus for a full quantity of liquid.

12. Capacitance type fluid measuring apparatus for indicating the mass of fluid in a container, the dielectric constant of the fluid being representative within predetermined tolerable limits of the density of the same fluid within the range of fluids to be measured, comprising in combination: a measuring condenser having spaced electrodes immersible in the fluid in the container and constructed and arranged with respect to said container such that its capacity is a function of both the volume and dielectric constant of the fluid in the container; a reference condenser having a normally fixed capacity; an auxiliary condenser having electrodes constructed and arranged for substantially complete immersion in a representative sample of the fluid such that its capacity is a function of the dielectric constant of the fluid in the container; a supply transformer having primary winding means and secondary winding means having an intermediate tap; circuit means connecting said measuring condenser to said secondary winding means on one side of said intermediate tap for producing a current of a first phase which is a function of the capacity of said measuring condenser; means for producing a current of a phase opposite to said current of a first phase, including a rebalancing potentiometer having its input electrically coupled across a portion of said secondary winding means on the other side of said intermediate tap and having its adjustable output coupled in series with said reference condenser for producing a first component of variable current substantially opposite in phase to said current of said first phase and proportional to the setting of said potentiometer, a second transformer having primary winding means electrically coupled across the adjustable output of said potentiometer to receive a voltage proportional to the setting thereof and having secondary winding means, circuit means coupling said auxiliary condenser in series with said secondary winding means of said second transformer between said tap and a junction between the free ends of said measuring and reference condensers for providing a second component of variable current substantially in phase with said first variable component and proportional to both the setting of said potentiometer and to the capacitance value of said auxiliary condenser; means connected between said tap and said junction and responsive to any output voltage resulting from the current of said first phase and the current of said opposite phase, for adjusting the setting of said potentiometer in a direction to reduce said output voltage to zero, and means responsive to the adjustment of said potentiometer for indicating the mass of fluid in the container, the relative values of said first and second components of variable current being so related to the relationship between the dielectric constant and density of the fluid that a substantially accurate indication of said mass is obtained.

13. Capacitance type fluid measuring apparatus for indicating the mass of fluid in a container, the dielectric constant of the fluid being representative within predetermined tolerable limits of the density of the same fluid within the range of fluids to be measured, comprising in combination: a measuring condenser having spaced electrodes immersible in the fluid in the container and constructed and arranged with respect to said container such that its capacity is a function of both the volume and dielectric constant of the fluid in the container; a reference condenser having a normally fixed capacity; an auxiliary condenser having electrodes constructed and arranged for substantially complete immersion in a representative sample of the fluid such that its capacity is a function of the dielectric constant of the fluid in the container; a supply transformer having primary winding means and secondary winding means having an intermediate tap; circuit means connecting said measuring condenser to said secondary winding on one side of said intermediate tap for producing a current of a first phase which is a function of the capacity of said measuring condenser; means for producing a current of a phase opposite to said current of a first phase, including a rebalancing potentiometer having its input electrically coupled across a portion of said secondary winding means on the other side of said intermediate tap and having its adjustable output electrically coupled in series with said reference condenser for producing a first component of variable current substantially opposite in phase to said current of said first phase and proportional to the setting of said potentiometer, a second transformer having primary winding means electrically coupled across the adjustable output of said potentiometer to receive a voltage proportional to the setting thereof and having a center-tapped secondary winding having its center tap electrically coupled to said intermediate tap, a further condenser having a normally fixed capacity, said auxiliary condenser and said further condenser being electrically coupled respectively between opposite ends of said center-tapped secondary winding and a junction between the free ends of said measuring and reference condensers for providing a second component of variable current substantially in phase with said first variable component and proportional to both the setting of said potentiometer and to the capacitance value of said auxiliary condenser; means connected between said intermediate tap and said junction of the measuring and reference condensers and responsive to any output voltage resulting from the current of said first phase and the current of said opposite phase, for adjusting the setting of said potentiometer in a direction to reduce said output voltage to zero, and means responsive to the adjustment of said potentiometer for indicating the mass of fluid in the container, the relative values of said first and second components of variable current being so related to the relationship between the dielectric constant and density of the fluid that a substantially accurate indication of said mass is obtained.

14. Capacitance type fluid measuring apparatus for indicating the mass of fluid in a container, the dielectric constant of the fluid being representative within predetermined tolerable limits of the density of the same fluid within the range of fluids to be measured, comprising in combination: a first circuit including a first alternating voltage source and a measuring condenser having spaced electrodes immersible in the fluid in the container and constructed and arranged with respect to said container such that its capacity is a function of both the volume and dielectric constant of the fluid in the container; a second circuit including a second alternating voltage source out of phase with said first voltage source, and an auxiliary condenser having electrodes constructed and arranged for substantially complete immersion in a representative sample of the fluid such that its capacity is a function of the dielectric constant of the fluid in the container; a third circuit including a fixed source of alternating voltage and a variable source of alternating voltage out of phase with said first voltage source, and a reference condenser having a normally fixed capacity; an amplifier common to said three circuits and connected to receive the output, respectively, thereof; means operable under the control of said amplifier for varying said second voltage source and the variable voltage source of said third circuit in response to differential current output from said circuits in a direction tending to reduce said differential output current substantially to zero; and indicating means under control of said last-named means for indicating the mass of fluid in the container, the relative values of the currents from said second and third curcuit being so related to the relationship between the dielectric constant and density of the fluid that a substantially accurate indication of said mass is obtained.

References Cited in the file of this patent

UNITED STATES PATENTS

| | | |
|---|---|---|
| 2,188,628 | Freystedt | Jan. 30, 1940 |
| 2,300,562 | Freystedt | Nov. 3, 1942 |
| 2,541,743 | Brockman et al. | Feb. 13, 1951 |
| 2,563,280 | Schafer | Aug. 7, 1951 |
| 2,563,281 | Griffith | Aug. 7, 1951 |
| 2,581,085 | Edelman | Jan. 1, 1952 |
| 2,622,442 | Boisblanc | Dec. 23, 1952 |

FOREIGN PATENTS

| | | |
|---|---|---|
| 114,980 | Sweden | Sept. 18, 1945 |

OTHER REFERENCES

Electronics, April 1950, pages 77–79 inclusive. Copy in Div. 36. 73–304.